Jan. 6, 1970          C. W. GUYTON ET AL          3,487,496
PLASTIC DOORKNOB
Filed Feb. 13, 1967

INVENTORS
CHARLES W. GUYTON,
CORINE WARBINGTON

United States Patent Office 3,487,496
Patented Jan. 6, 1970

---

3,487,496
PLASTIC DOORKNOB
Charles W. Guyton, 505 Main St. 75202, and Corine Warbington, 3427 Latimer St. 75215, both of Dallas, Tex.
Filed Feb. 13, 1967, Ser. No. 615,525
Int. Cl. E05b 1/00
U.S. Cl. 16—121                                    1 Claim

ABSTRACT OF THE DISCLOSURE

A translucent or transparent doorknob having a structure consisting of a design such as a three dimensional flower arrangement, with a background element serving to contrast the design or the like.

---

This invention relates to decorative knobs, and more particularly to a plastic doorknob.

It is therefore the main purpose of this invention to provide a plastic doorknob which will be made of clear plastic with a flower design imbedded within the plastic thus providing a novel and decorative doorknob.

Another object of this invention is to provide a plastic doorknob which will have a white or other suitable background for the flower design enclosed within the main body of this structure.

A still further object of this invention is to provide a plastic doorknob which may have a variety of flower designs contained within the main body thereof.

Other objects and advantages of the invention will become apparent from a consideration of the following detailed description taken in connection with the accompanying drawing wherein a satisfactory embodiment of the invention is shown. However, it is to be understood that this invention is not limited to the details disclosed but includes all variations and modifications as fall within the spirit of the invention and the scope of the appended claims.

Figure 1:
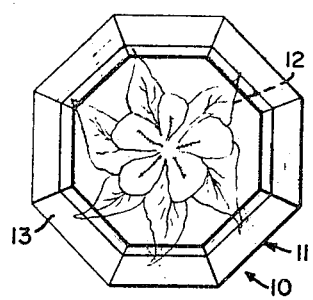
FIGURES 1, 2 and 3 are front, side and rear views respectively of the invention depicting the basic idea of a doorknob in which the forward portion is of clear transparent plastic through which a floral design is viewed while its rear portion, enclosing the connection to the lock is opaque, the two plastics being integrally formed.

According to this invention, a plastic knob 10 is provided with a main body 11 within which is molded a flower design 12. Main body 11 is also provided with a plurality of adjacent facets 13 which not only serve to enhance this decorative appearance of knob 10 but also provides a non-slip gripping means for the hands of the person turning the knob 10. From the rear of main body 11 extends a tapered neck 14 in which an opening 15 is provided for securement of knob 10 to a shaft of the lock mechanism (not shown). It shall be noted that the flower design 12 is backed by an opaque material within the main body 11 of knob 10.

Figure 4:
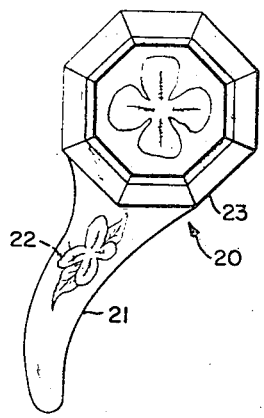
FIGURES 4 and 5 are front and side views, respectively, of a lever type knob of like construction as shown in FIGURES 1, 2 and 3.
Figure 5:
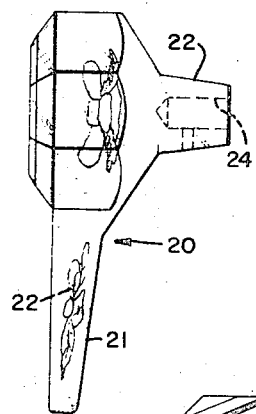

Looking now at FIGURES 4 and 5 of the drawing, one will see a modified form of plastic door knob 20 which is provided with an offset lever 21 in which is embedded a flower design 22.

Figure 2:
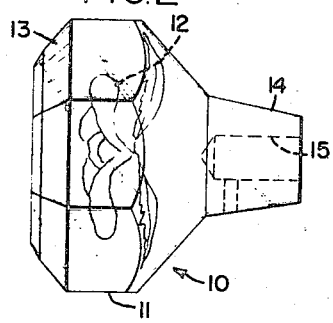
Figure 3:
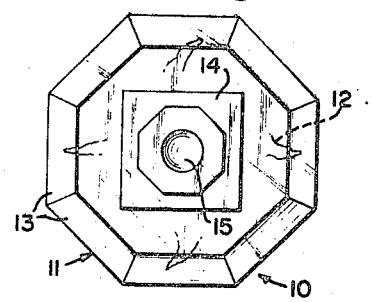

It will be noted that the main body 23 of knob 20 is similar in construction to that of knob 10 shown in FIGURES 1, 2 and 3.

Plastic doorknob 20 is provided with an extending neck 22 having an opening 24 for receiving the shaft of a door lock mechanism.

Figure 6:
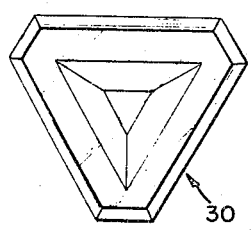
FIGURES 6 and 7 are front and side views, respectively, of a kalidoscopic design of a knob in which the colors of glass chips in a cavity are reflected in various patterns on mirrored surfaces.
Figure 7:
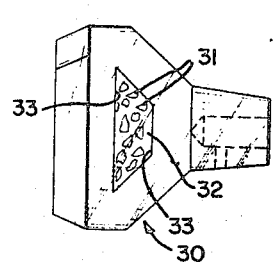

Looking now at FIGURES 6 and 7, one will see another modified plastic doorknob 30 having a plurality of colored chips 31 received within the cavity 32, the plurality of colored chips 31 are reflected by mirrored surfaces 33 of cavity 32 thus providing a continuously changing kalidoscopic design when knob 30 is rotated.

Figure 8:
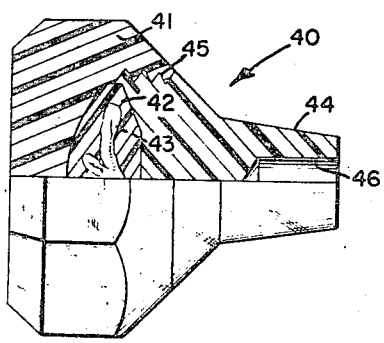
FIGURE 8 is a partial side view and partial longitudinal section of a doorknob comprising separable parts as will be explained.
Figure 9:
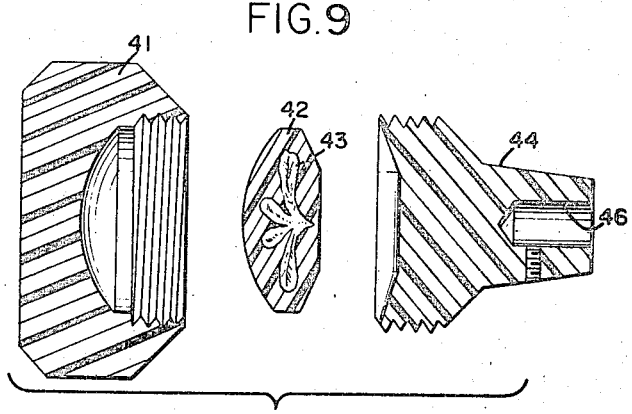
FIGURE 9 is an exploded view of the knob shown in FIGURE 8.

Looking now at FIGURES 8 and 9 of the drawing, one will see another modified form of plastic doorknob 40 having a main body 41 in which is received an insert 42 having a flower design 43 molded therein. Knob 40 is provided with a neck 44 which is externally threaded and the threading is received within an internally threaded opening 45 of main body 41. Neck 44 is provided with an opening 46 for mounting into the door mechanism.

Figure 10:
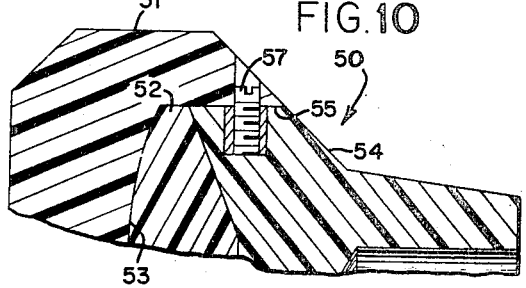
FIGURE 10 is a sectional detail showing a further modification of the construction seen in FIGURES 8 and 9.

Looking now at FIGURE 10 of the drawing, one will see a still further modified form of plastic doorknob 50 having a main body 51 in which is received an insert 52. Insert 52 abuts with a congregated surface 53 and is backed by a neck 54 which is received within opening 55. Neck 54 is provided with a flush sleeve 56 which is internally threaded to receive a set screw 57. Said screw 57 thus provides a means of securing the entire assembly 57 thus provides a means of securing the entire assembly of knob 50 together and enables all of the members to be interchangeable when desired.

It will also be noted that various fall patterns may be used or even other suitable designs may be used within the various structures heretofore described.

What we now claim is:

1. A doorknob comprising, in combination, a transparent main body portion providing gripping means and mounting means for said knob, a flower element of decorative appearance with its back portion facing and adjacent to an opaque element, said decorative element and said opaque element imbedded within and fixedly secured within said main body portion of said knob, said transparent main body including an integral, radially extending, offset lever of arcuate configuration when viewed from a front direction, said offset lever having a flower design imbedded therewithin.

References Cited

UNITED STATES PATENTS

| | | | |
|---|---|---|---|
| 1,848,526 | 3/1932 | Heerwagen | 40—331 |
| 2,142,791 | 1/1939 | Koza | 40—332 |
| 85,799 | 1/1869 | Day | 40—331 |
| 1,993,938 | 3/1935 | McDonald | 40—331 |
| 1,929,188 | 10/1933 | Kasch | 16—121 |
| 2,107,204 | 2/1938 | Macksey | 16—121 |

BOBBY R. GAY, Primary Examiner

D. L. TROUTMAN, Assistant Examiner